United States Patent
Hirose (10) Patent No.: US 8,204,681 B2
(45) Date of Patent: Jun. 19, 2012

(54) NAVIGATION APPARATUS, ROUTE GUIDE METHOD AND PROGRAM

(75) Inventor: Chihiro Hirose, Saitama (JP)

(73) Assignee: Pioneer Corporation, Tokyo (JP)

( * ) Notice: Subject to any disclaimer, the term of this patent is extended or adjusted under 35 U.S.C. 154(b) by 802 days.

(21) Appl. No.: 12/296,676

(22) PCT Filed: Mar. 22, 2007

(86) PCT No.: PCT/JP2007/055902
§ 371 (c)(1),
(2), (4) Date: Dec. 3, 2008

(87) PCT Pub. No.: WO2007/116637
PCT Pub. Date: Oct. 18, 2007

(65) Prior Publication Data
US 2009/0177380 A1 Jul. 9, 2009

(30) Foreign Application Priority Data
Apr. 11, 2006 (JP) .................................. 2006-108839

(51) Int. Cl.
*G01C 21/30* (2006.01)
(52) U.S. Cl. ................... 701/411; 701/409; 340/995.19; 340/995.2
(58) Field of Classification Search .................. 701/200, 701/207, 209, 211, 213; 340/995.2, 995.19
See application file for complete search history.

(56) References Cited

U.S. PATENT DOCUMENTS

| 5,528,501 | A | * | 6/1996 | Hanson | 701/200 |
|---|---|---|---|---|---|
| 2006/0080034 | A1 | * | 4/2006 | Hayashi | 701/211 |
| 2010/0198497 | A1 | * | 8/2010 | Okuno | 701/201 |

FOREIGN PATENT DOCUMENTS

| JP | 10-103995 | 4/1998 |
|---|---|---|
| JP | 11-083524 | 3/1999 |
| JP | 11-125530 | 5/1999 |
| JP | 2001-272243 | 10/2001 |

* cited by examiner

*Primary Examiner* — Kaitlin Joerger
*Assistant Examiner* — Ernesto Suarez
(74) *Attorney, Agent, or Firm* — Young & Thompson (57) ABSTRACT

A navigation device provides route guidance only by voice guidance even if route guidance by a display screen is impossible. A navigation device displays on a display device a navigation screen including a map about a current position. The display device can enter a no-display state. In the navigation device, regardless of the state of the navigation screen, a route guidance method is performed. More particularly, in the display state, a guidance route is determined by a normal mode and route guidance is performed by both voice and display. In the no-display state, a guidance route including fewer movement methods is determined and route guidance is made only by voice guidance. Thus, in the no-display state where the navigation screen is not displayed, a guidance route is determined so as to enable route guidance only by voice.

10 Claims, 6 Drawing Sheets

NAVIGATION APPARATUS, ROUTE GUIDE METHOD AND PROGRAM

TECHNICAL FIELD

The present invention relates to a route guide in a navigation apparatus.

BACKGROUND TECHNIQUE

There is known a car navigation apparatus having a route guide function to a destination. Generally, when a user designates a destination, the route to the destination is calculated, and a guide route is determined. When a vehicle of the user approaches the guide point on the guide route, guide information indicating a right/left-turn at the guide point is presented by a display on a display screen and a sound guidance (see Patent Reference 1, for example).

Generally, the route guide is executed by two methods, i.e., a guide on a display screen and a guide with a sound. In the guide on the display screen, the guide route is indicated in a specific color on a map screen, and an enlarged intersection map is displayed thereon, for example. In the guide with the sound, such a sound message as "GO STRAIGHT AHEAD 100 M, AND TURN TO THE RIGHT" is reproduced in front of the intersection, for example.

However, in the normal navigation apparatus, even when no navigation screen is displayed on a display device during displaying a sound list of a reproduced CD, the normal route guide is executed. Namely, even when no guide is executed on the display screen, the route guide is executed in the method determined by assuming that both of the guide on the display screen and the guide with the sound are executed. Therefore, the route which is actually impossible to drive only with the guide sound is sometimes guided. For example, even if the guide only with such a sound as "GO THE SIDE ROAD SOON. AFTERWARD, GO IN THE OBLIQUE DIRECTION" is executed, it is very difficult to travel as guided without the guide on the display screen.

As such a case that no navigation screen is displayed on the display device, there are such a case that a monitor in an in-dash type is stored in a main body and such a case that a monitor is not connected to a navigation apparatus including the attachable and detachable monitor, other than the above example. However, those cases are similar.

Patent Reference-1: Japanese Patent Application Laid-open under No. H11-83524

DISCLOSURE OF INVENTION

Problem to be Solved by the Invention

The present invention has been achieved in order to solve the above problem. It is an object of this invention to provide a navigation apparatus enabling an appropriate route guide only with a sound guide even in such a state that a route guide on a display screen is impossible.

According to one aspect of the present invention, there is provided a navigation apparatus including: a display control unit which displays a navigation screen on a display device; a display state determining unit which determines whether a state is a display state in which the navigation screen is displayed or a no-display state in which the navigation screen is not displayed; and a route guide unit which searches a route to a destination and executes a route guide in accordance with a guide route obtained by searching, wherein, in the display state, the route guide unit determines the guide route and executes the route guide with a guide sound and a guide display on a display screen according to a normal mode, and wherein, in the no-display state, the route guide unit determines the guide route so that the determined route includes less traveling method, for which the route guide is difficult to execute only with the guide sound, than in the normal mode and executes the route guide only with the guide sound according to a no-display mode.

The above navigation apparatus is mounted on a movable body such as a vehicle, and displays the navigation screen on the display device. The display device displays the screen other than the navigation screen, or is stored in the navigation apparatus. Or the display device is removed from the main body of the navigation apparatus. In those cases, the state sometimes becomes the no-display state in which the navigation screen is not displayed. It is determined whether the navigation screen is in the display state or in the no-display state. In accordance with the result, the route guide method is controlled. Concretely, in the display state, the guide route is determined, and the route guide with the guide sound and the guide display on the display screen is executed, according to the normal mode. Meanwhile, in the no-display state, the guide route is determined so that the determined route includes less traveling method, for which the route guide is difficult to execute only with the guide sound, than in the normal mode, and the route guide is executed only with the guide sound, according to the no-display mode. "Traveling method, for which the route guide is difficult to execute only with the guide sound" includes a right/left-turn and approaching a frontage road from a main road. Thereby, in such a no-display state that the navigation screen is not displayed, the guide route is determined to enable the appropriate guide only with the sound. In a preferred example, the route guide unit may determine the guide route, in the no-display mode, so that the determined route includes fewer right/left-turn than in the normal mode.

In a manner of the above navigation apparatus, the route guide unit may determine the guide route, in the no-display mode, so that the determined route includes more direct advance than in the normal mode.

In another manner of the above navigation apparatus, the route guide unit may include a route searching unit which calculates totals of link costs assigned to roads forming each route and turn costs assigned to intersections for plural routes to the destination and which determines the route having a minimum total as the guide route. In the no-display mode, the route searching unit modifies the cost in order to gain the guide route capable of easily executing the guide only with the sound guide, as compared with the case in the normal mode.

In a preferred example of the method of modifying the cost, the route searching unit may increase, in the no-display mode, the turn cost of right/left-turn at each intersection to be larger than in the normal mode. In another preferred example, in the no-display mode, the route searching unit may decrease the link cost corresponding to a wide road to be smaller than in the normal mode and may increase the link cost corresponding to a narrow road to be larger than in the normal mode. In still another preferred example, the navigation apparatus may further include a history storage unit which stores a number of past traveling in each road, and the route searching unit may decrease, in the no-display mode, the link cost of a road having the number of past traveling, equal to or larger than a predetermined number, to be smaller than in the normal mode.

In still another manner of the above navigation apparatus, when the display state determining unit detects a change of a display state, the route guide unit may change the mode between the normal mode and the no-display mode and may execute the route search again in the changed mode. Thereby, whenever the mode of the route guide is changed, the appropriate guide route is set again in accordance with the changed mode.

According to another aspect of the present invention, there is provided a route guide method including: a display control process which displays a navigation screen on a display device; a display state determining process which determines whether a state is a display state in which the navigation screen is displayed or a no-display state in which the navigation screen is not displayed; and a route guide process which searches a route to a destination and executes a route guide in accordance with a guide route obtained by searching, wherein, in the display state, the route guide process executes route search and executes the route guide with a display screen and a guide sound in accordance with an obtained guide route according to a normal mode, and wherein, in the no-display state, the route guide process executes the route search so that the searched route includes less traveling method, for which the route guide is difficult to execute only with the guide sound, than in the normal mode and executes the route guide only with the guide sound in accordance with the obtained guide route according to a no-display mode. By this method, in the no-display state in which the navigation screen is not displayed, the guide route is determined so that the guide only with the sound becomes possible.

According to still another aspect of the present invention, there is provided a route guide program executed in a navigation apparatus including a computer, the navigation apparatus making the computer function as: a display control unit which displays a navigation screen on a display device; a display state determining unit which determines whether a state is a display state in which the navigation screen is displayed or a no-display state in which the navigation screen is not displayed; and a route guide unit which searches a route to a destination and executes a route guide in accordance with the guide route obtained by searching, wherein, in the display state, the route guide unit executes route search and executes the route guide with a display screen and a guide sound in accordance with an obtained guide route according to a normal mode, and wherein, in the no-display state, the route guide unit executes the route search so that the searched route includes less traveling method, for which the route guide is difficult to execute only with the guide sound, than in the normal mode and executes the route guide only with the guide sound in accordance with the obtained guide route according to a no-display mode. By executing the program in the navigation apparatus, the guide route is determined so that the guide only with the sound becomes possible in the no-display state in which the navigation screen is not displayed. The program recorded on the recording medium can be preferably used.

BRIEF DESCRIPTION OF THE REFERENCE NUMBER

1 Navigation apparatus
10 Stand-alone position measurement device
18 GPS receiver
20 System controller
22 CPU
36 Data storage unit
40 Display unit
60 Input device
70 Sound recognition unit

DETAILED DESCRIPTION OF THE PREFERRED EMBODIMENTS

Now, a description will be given of a preferred embodiment of the present invention with reference to attached drawings. The explanation which will be given below shows such an example that the present invention is applied to an on-vehicle navigation apparatus.

[Navigation Apparatus]

Figure 1:
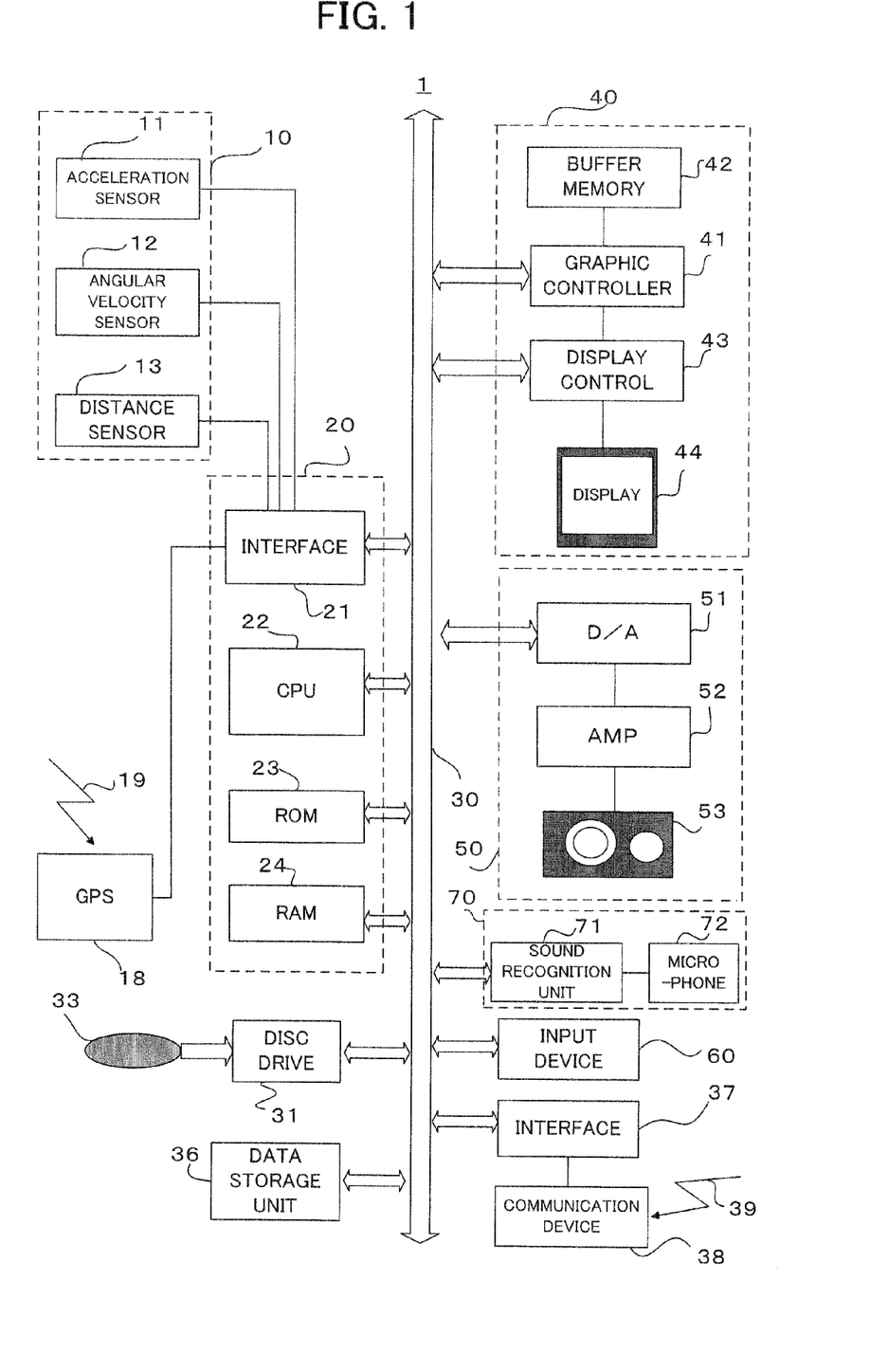
FIG. 1 is a block diagram schematically showing a configuration of a navigation apparatus.

FIG. 1 shows a configuration of a navigation apparatus 1. As shown in FIG. 1, the navigation apparatus 1 includes a stand-alone position measurement device 10, a GPS receiver 18, a system controller 20, a disc drive 31, a data storage unit 36, a communication interface 37, a communication device 38, a display unit 40, a sound output unit 50, an input device 60 and a sound recognition unit 70.

The stand-alone position measurement device 10 includes an acceleration sensor 11, an angular velocity sensor 12 and a distance sensor 13. The acceleration sensor 11 includes a piezoelectric element, for example, and detects the acceleration degree of the vehicle and outputs the acceleration data. The angular velocity sensor 12 includes a vibration gyroscope, for example, and detects the angular velocity of the vehicle at the time of changing the direction of the vehicle and outputs the angular velocity data and the relative direction data. The distance sensor 13 measures a vehicle speed pulse including a pulse signal generated with the wheel rotation of the vehicle.

The GPS receiver 18 receives an electric wave 19 for transmitting downlink data including position measurement data from plural GPS satellites. The position measurement data is used for detecting the absolute position of the vehicle from longitude and latitude information.

The system controller 20 includes an interface 21, a CPU (Center Processing Unit) 22, a ROM (Read Only Memory) 23 and a RAM (Random Access Memory) 24, and controls the entire navigation apparatus 1.

The interface 21 executes the interface operation with the acceleration sensor 11, the angular velocity sensor 12, the distance sensor 13 and the GPS receiver 18. Then, the interface 21 inputs the vehicle speed pulse, the acceleration data, the relative direction data, the angular velocity data, the GPS measurement data and the absolute direction data into the system controller 20. The CPU 22 controls the entire system controller 20. The ROM 23 includes a non-volatile memory (not shown) in which a control program for controlling the system controller 20 is stored. The RAM 24 readably stores various kinds of data such as route data preset by the user via the input device 60, and supplies a working area to the CPU 22.

The system controller 20, the disc drive 31 such as a CD-ROM drive or a DVD-ROM drive, the data storage unit 36, the communication interface 37, the display unit 40, the sound output unit 50 and the input device 60 are connected to each other via a bus line 30.

Under the control of the system controller 20, the disc drive 31 reads contents data such as sound data and video data from a disc 33 such as a CD and a DVD to output the contents data. The disc drive 31 may be the CD-ROM drive or the DVD-ROM drive, or may be a drive compatible between the CD and the DVD.

The data storage unit 36 includes HDD, for example, and stores various kinds of data used for a navigation process such as map data and facility data.

The communication device 38 includes an FM tuner, a beacon receiver, a mobile phone and a dedicated communication card, for example, and receives road traffic information, such as traffic jam information and traffic information, and other information delivered from a VICS (Vehicle Information Communication System) center via the communication interface 37.

The display unit 40 displays various kinds of display data on a display device such as a display under the control of the system controller 20. Concretely, the system controller 20 reads the map data from the data storage unit 36. The display unit 40 displays, on a display screen such as a display, the map data read from the data storage unit 36 by the system controller 20. The display unit 40 includes a graphic controller 41 for controlling the entire display unit 40 on the basis of the control data transmitted from the CPU 22 via the bus line 30, a buffer memory 42 for temporarily storing image information having a memory such as a VRAM (Video RAM) and immediately displayable, a display control unit 43 for controlling a display 44 such as a liquid crystal and a CRT (Cathode Ray Tube) on the basis of the image data outputted from the graphic controller 41, and the display 44. The display 44 is formed by a liquid crystal display device of the opposite angle 5-10 inches, and is mounted in the vicinity of a front panel of the vehicle.

The sound output unit 50 includes a D/A converter 51 for executing D/A (Digital to Analog) conversion of the sound digital data transmitted from the CD-ROM drive 31, a DVD-ROM 32 or the RAM 24 via the bus line 30 under the control of the system controller 20, an amplifier (AMP) 52 for amplifying a sound analog signal outputted from the D/A converter 51, and a speaker 53 for converting the amplified sound analog signal into the sound and outputting it to the vehicle compartment.

The input device 60 includes keys, switches, buttons, a remote controller and a sound input device, which are used for inputting various kinds of commands and data. The input device 60 is arranged in the vicinity of the display 44 and a front panel of a main body of an on-vehicle electric system loaded on the vehicle. Additionally, in such a case that the display 44 is in a touch panel system, a touch panel provided on the display screen of the display 44 functions as the input device 60, too.

The sound recognition unit 70 includes a sound recognition unit 71 and a microphone 72. The sound instruction given by the user is collected by the microphone 72 to be inputted to the sound recognition unit 71. The sound recognition unit 71 executes the recognition process of the sound instruction given by the user, and supplies the recognition result to the system controller 20. Thereby, the user can input the instruction through the sound, instead of the input device 60 such as a remote control and a touch panel.

[Route Guide]

Figure 2:
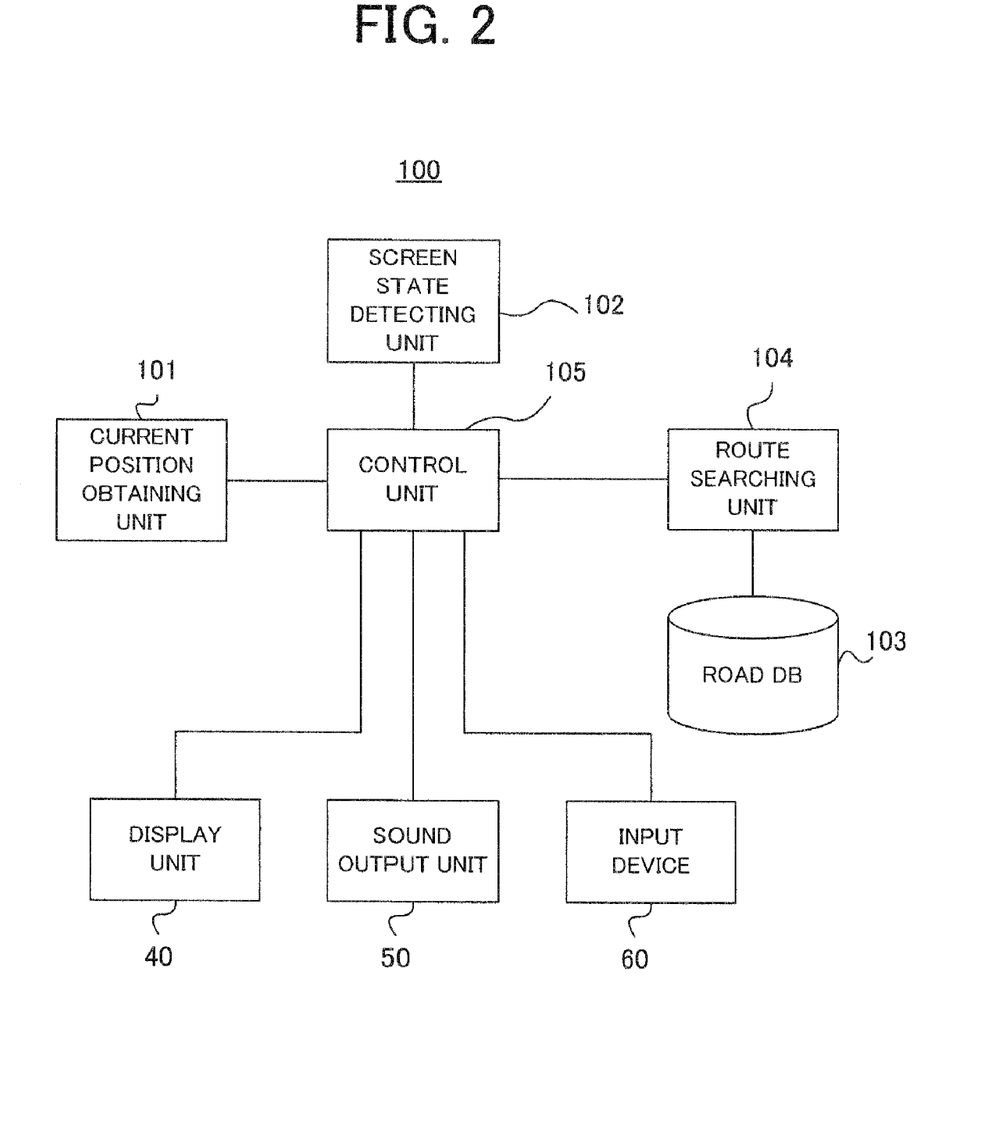
FIG. 2 is a functional block diagram showing a configuration for executing a route guide.

Next, a description will be given of the route guide according to an embodiment. FIG. 2 shows a functional configuration of a route guide unit for executing the route guide. The route guide unit 100 is substantively formed by the components of the navigation apparatus 1. As shown in FIG. 2, the route guide unit 100 includes a current position obtaining unit 101, a screen state detecting unit 102, a road DB 103, a route searching unit 104 and a control unit 105.

The current position obtaining unit 101 is formed by the GPS receiver 18 shown in FIG. 1, and obtains the current position of the vehicle, i.e., the longitude and the latitude. The screen state detecting unit 102 determines the state of the display screen, i.e., whether or not the navigation screen is displayed. The navigation screen is the display screen while the navigation function is executed. That is, the navigation screen is basically the screen displaying the image of the map around the current position of the vehicle.

Such a state that the display device displays the navigation screen is referred to as "display state", and such a state that the display device does not display the navigation screen is referred to as "no-display state". The no-display state actually includes some cases. The recent navigation apparatus is formed so that the navigation screen and other screen such as a screen for displaying a song list of a sound CD during reproduction and a screen for displaying the reproduction image such as a TV image and a DVD image are switchable. In this case, such a case that the image other than the navigation screen is displayed corresponds to the no-display state. In the case of the navigation apparatus of this kind, the switching between the navigation screen and the other screen is executed by the operation of the user to the input device such as the remote controller and the touch panel. Therefore, the screen state detecting unit 102 can determine the display state and the no-display state by detecting the operation of the user for switching the screen.

In addition, there is known the navigation apparatus including the display device such as the CRT, which is storable in the main body. When the display device of the navigation apparatus of this kind is stored in the main body, the user cannot see the screen. Thus, such a state that the display device is stored in the main body corresponds to the no-display state. In this case, the switching of withdrawing/storing the display device is executed by the operation of the user to the remote controller and the button provided in the main body of the navigation apparatus. Therefore, the screen state detecting unit 102 can determine the display state and the no-display state by detecting the operation.

Also, there is known the navigation apparatus including the monitor attachable to and detachable from its main body. In this case, such a state that the monitor is removed from the main body corresponds to the no-display state. The screen state detecting unit 102 determines whether or not the monitor is connected to the main body, i.e., whether the state is the display state or the no-display state, by detecting the existence or non-existence of the electric connection between the monitor and the main body. As described above, the screen state detecting unit 102 is formed by the input device 60 and the system controller 20.

Road database (hereinafter, "database" is expressed by "DB") 103 stores the road data (data of road network). The detailed description will be given later, but the road data is basically formed by a link corresponding to the road, and a node corresponding to the intersection. The road DB 103 is typically provided in the data storage unit 36 shown in FIG. 1.

The route searching unit 104 calculates the route from a start point (the current position of the vehicle or the point set by the user) to the destination set by the user, and determines the guide route. This process is referred to as "route search". In the route search, the road data stored in the road DB 103 is used. The route searching unit 104 is formed by the system controller 20.

The control unit 105 controls each of the components shown in FIG. 2, and executes the route guide. The control unit 105 is formed by the system controller 20 shown in FIG. 1, and is connected to the input device 60, the display unit 40 and the sound output unit 50. Concretely, the control unit 105 obtains the destination which the user inputs into the input device 60, and obtains the current position of the vehicle from the current position obtaining unit 101 to supply it to the route searching unit 104. Thereby, the route search is executed. At this time, based on the detection result of the display state or the no-display state by the screen state detecting unit 102, the control unit 105 controls the mode of the route search in the route searching unit 104. In addition, when the guide route is determined by the route search, the control unit 105 controls the display unit 40 and the sound output unit 50 based on the current position of the vehicle and the guide route, and outputs the guide information. That is, the control unit 105 executes the route guide.

Figure 3A:
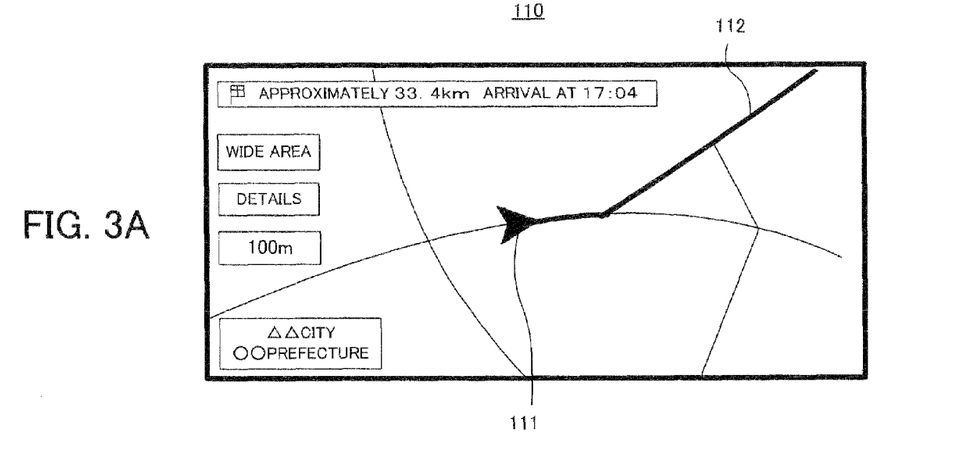
FIG. 3A is a diagram showing an example of a display screen.

Next, a description will be given of the navigation screen. FIG. 3A shows an example of the navigation screen. The navigation screen 110 includes the map around the current position of the vehicle, plural display buttons and operation buttons. In the example shown in FIG. 3A, the current position of the vehicle is indicated by the current position mark 111. In addition, the navigation screen 110 is an example of the screen during the route guide, and the guide route 112 is indicated by a heavy line in a predetermined color.

Figure 3B:
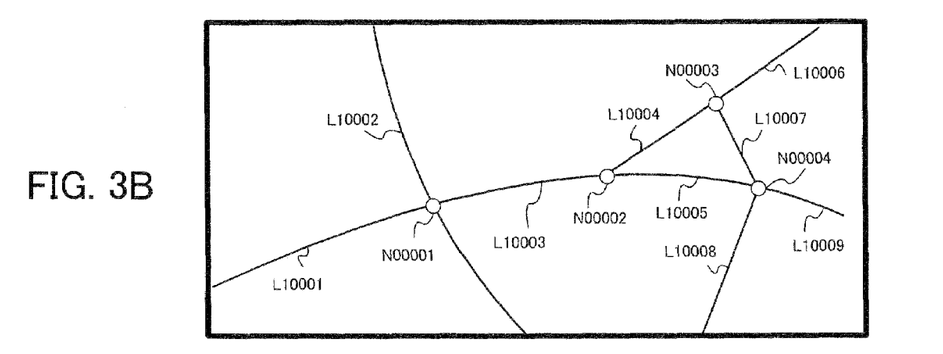
FIG. 3B is a diagram showing a configuration example of road data.

Next, a description will be given of the road data. FIG. 3B is a diagram showing the road data of the road in the map shown in FIG. 3A. The road data includes the plural nodes and links. The node corresponds to the road, and the link corresponds to the intersection. A node ID and a link ID are assigned to the node and the link, respectively. It can be assumed that the node ID is an intersection ID and the link ID is a road ID. In the example shown in FIG. 3B, the node ID (e.g., "N00001") including the first letter "N" is attached to each node. In addition, the link ID (e.g., "L10001") including the first letter "L" is attached to each link. The position coordinate of each node and the position coordinate of each link are stored in the road DB 103 as the road data.

Next, a description will be given of the route search according to this embodiment. First, the basic route search method will be explained. In this embodiment, the guide route is determined by the so-called cost calculation. Concretely, out of the plural routes from the current position to the destination, the route having the minimum total cost is determined as the guide route. "Cost" is the value assigned to each link and each node forming the map data, and indicates how easily the link and the node are chosen. The link and node having a large value of the cost are difficult to be chosen as the guide route, while the link and node having a small value of the cost are easy to be chosen as the guide route. Concretely, the cost includes the link cost given to each link and the turn cost given to each node. The link cost is predetermined for each link, based on the length of the correspondent road, the road width, the time necessary to pass, the number of traffic signals and the like. The turn cost is predetermined for each traveling direction in the intersection corresponding to the node. Generally, the turn cost of the direct advance is generally smallest at a normal crossroad (four-direction intersection), and the turn cost of right-turn is larger than that of left-turn.

Figure 4A:
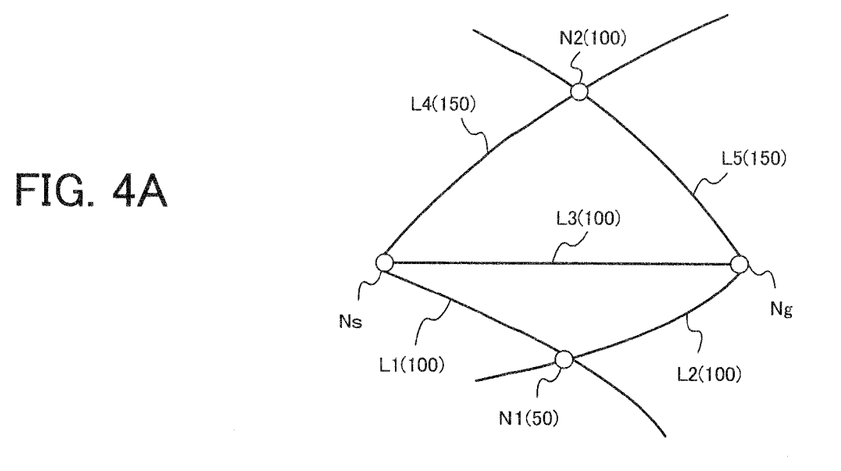
FIGS. 4A and 4B are diagrams for explaining a method of route search.

FIG. 4A shows an example of the route search. FIG. 4A is an example of a very simple route search, and indicates the case of searching the route from a node Ns being the start point to a node Ng being the destination. The number in the parenthesis of each link indicates the value of the link cost, and the number in the parenthesis of each node indicates the turn cost in the case of going in the direction of the destination Ng from the start point Ns of each node. In this case, three routes to the destination Ng can be assumed.

First route: Node Ns→Node N2→Node Ng: Cost total=400
Second route: Node Ns→Node Ng: Cost total=100
Third route: Node Ns→Node N1→Node Ng: Cost total=250

Therefore, the second route having the minimum cost total is chosen as the guide route.

Next, a description will be given of the route search according to this embodiment. In this embodiment, the cost value in the route search is changed in correspondence with whether or not the route guide of the screen display is executed in the navigation apparatus. Concretely, in such a case that the route guide on the screen display is executed, i.e., in "display state" in which the navigation screen is displayed, the above-mentioned cost calculation is executed based on the cost values of the link and node normally prepared, and the guide route is determined. Meanwhile, in such a case that the route guide of the screen display is not executed, i.e., in "no-display state" in which the navigation screen is not displayed, the cost values of the link and the node are changed by a method described below in order to determine the guide route which passes less points difficult to guide only with the sound. This reason is that, since the route guide of the screen display cannot be executed and the route guide only with the sound guide is executed in the no-display state, it is preferable to choose the guide route easily understandable only with the sound guide. Now, a description will be given of the method of changing the cost values of the link and the node in the no-display state in which the navigation screen is not displayed. The mode of the route guide in the display state is referred to as "normal mode", and the mode of the route guide in the no-display state is referred to as "no-display mode".

[First Method]

A first method is to increase the cost of right/left-turn in the no-display mode, as compared with the case in the normal mode. In the case of only the sound guide, it is sometimes difficult to explain the direction of right/left-turn with using only the words. Particularly, when there are plural roads in the same direction at the intersection, it is difficult to explain which direction to go with using only the words. Thus, the guide route is determined so that the number of right/left-turns becomes small. Concretely, in the route search in the no-display mode, the turn cost in each node, i.e., at the intersection, is increased. As the increase method, there is a method of increasing double, triple and . . . , for example. Thereby, the guide route includes fewer right/left-turns.

Figure 4B:
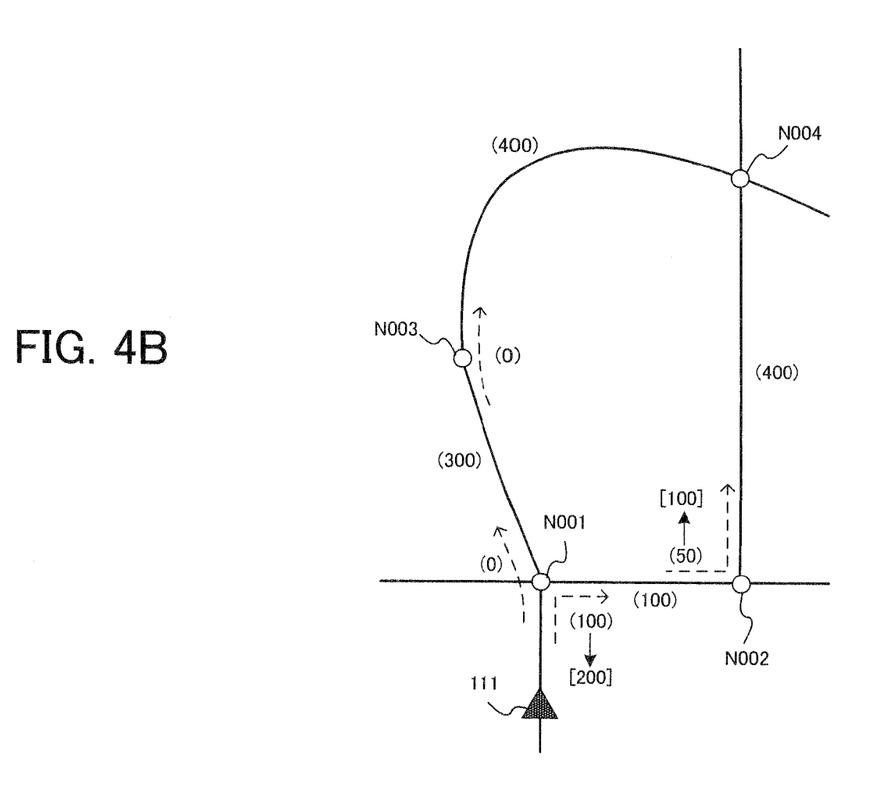

FIG. 4B shows an example. In FIG. 4B, the number in the parenthesis indicates the cost value. As the route of going from a node N001 to a node N004, there are two routes, i.e., a route via a node N002 and a route via a node N003. In the normal mode, the total cost of the route via the node N002 is $$100+100+50+400=650,$$

and the total cost of the route via the node N003 is $$0+300+0+400=700.$$

Therefore, in the normal mode, the route via the node NO02 is adopted.

However, in the no-display mode, the turn cost value is increased to the value indicated by the parenthesis shown in FIG. 4B. Hence, the total cost of the route via the node N002 is

200+100+100+400=800.

As a result, the route via the node N003 is adopted. That is, in the no-display mode, since the cost of right/left-turn (i.e., turn cost) is increased, not the route via the node N002, i.e., not the route including many right/left-turns, but the route via the node N003, i.e., but the route including fewer right/left-turns, is adopted. As described above, according to the no-display mode, the guide route including less right/left-turns is set by increasing the cost of right/left-turn more than in the normal mode. Thereby, the user can easily figure out the route only with the sound.

[Second Method]

Figure 5A:
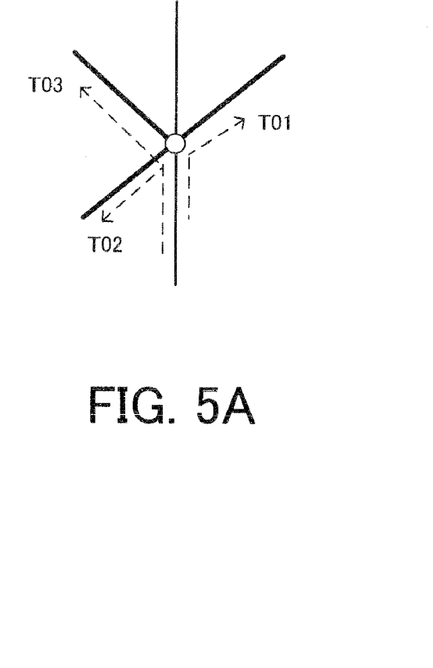
FIGS. 5A to 5D are diagrams for explaining a cost change method in a no-display mode.
Figure 5B:
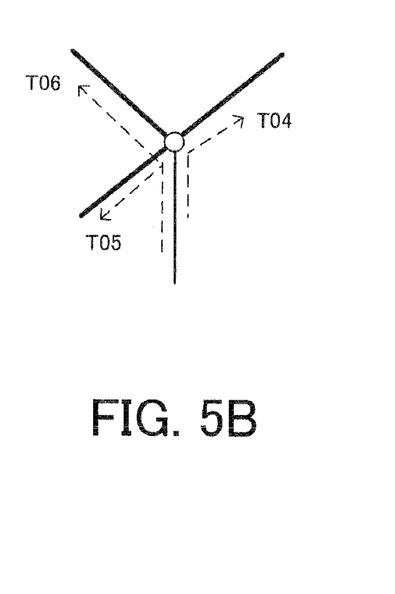
Figure 5C:
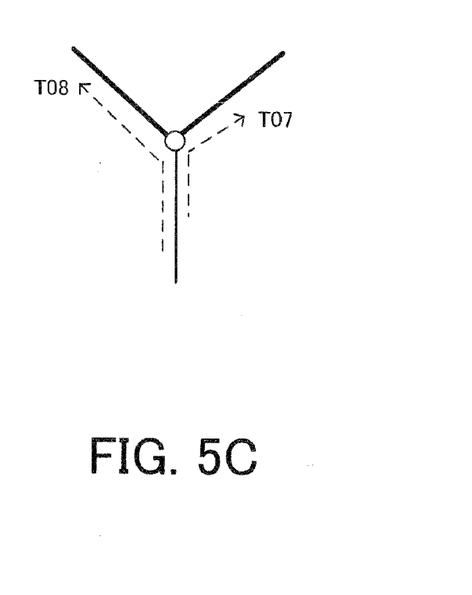

A second method is to increase, in the no-display mode, the cost in the case of going to the direction other than the straight direction at a five-or-more-direction intersection to be larger than in the normal mode. The above first method is mainly to increase the cost of right/left-turn at the crossroad (i.e., four-direction intersection). For the same purpose, the second method is to increase the cost at the time of going to the direction other than the straight direction at the intersection. Concretely, at the five-direction intersection shown in FIG. 5A, turn costs T01 to T03 in the case of going to the direction other than the straight direction, i.e., the direction shown by a broken line, is Increased to be larger than those in the normal mode. As another example, at the intersection without the straight road as shown in FIG. 5B, costs T04 to T06 are similarly increased. In addition, at a Y-shaped intersection shown in FIG. 5C, costs T07 and T08 are similarly increased. As the number of roads linked to the intersection becomes larger, the cost increasing rate may be increased. Namely, the cost increasing rate of the six-direction intersection may be larger than that of the five-direction intersection. Thereby, as the intersection becomes more complicated, the intersection is hardly included in the guide route.

[Third Method]

Figure 5D:
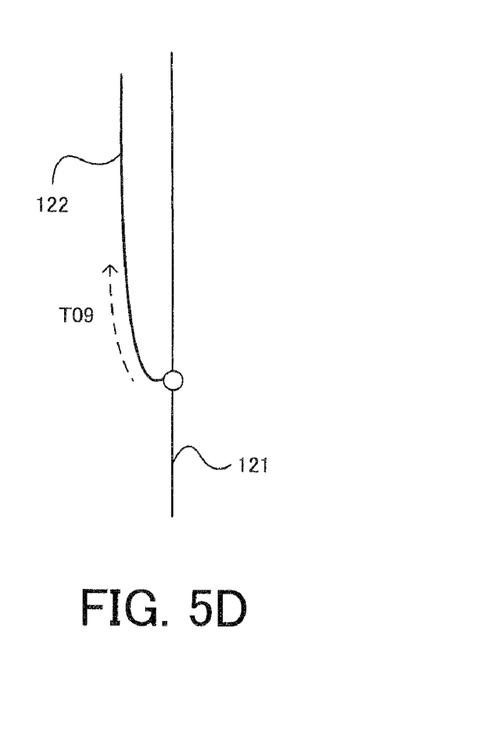

A third method is to increase, in the no-display mode, the cost in a case of entering a side road from a main road to be larger than in the normal mode. As shown in FIG. 5D, there is such a case that a side road 122 exists in correspondence with a main road 121 of the road. Generally, it is difficult to execute the guide to the side road only with the sound. In this case, by increasing the cost in the case of entering the side road 122, the rate at which the guide route of going to the side road 122 is set can be decreased.

[Fourth Method]

A fourth method is to increase, in the no-display mode, the cost of a narrow road (i.e., link cost) to be larger and to decrease the cost of a wide road to be smaller than those in the normal mode. Thereby, such a probability that the wide road such as a national highway and a prefecture highway is chosen is increased to be larger than the probability that the narrow road is chosen. Since the wide road such as the national highway and the prefecture highway generally includes many guide signatures and direction signboards, it is easy to travel only with the sound guide. It may be determined whether the road is narrow or wide, based on the road width or the number of lanes in the road data. For example, it is prescribed that the road equal to or larger than ○○m and the road including two or more lanes are wide and the road smaller than the wide road is narrow.

[Fifth Method]

A fifth method is to increase, in the no-display mode, the cost value of a city highway to be larger than in the normal mode, so that fewer city highways are passed. Generally, in the city highway such as a capital highway, a construction of a junction is complicated, and the guide of the screen display is important. Thus, by increasing the cost of the city highway, the city highway is hardly included in the guide route.

[Sixth Method]

A sixth method is to check the point difficult to guide and increase the cost in the case of passing the point, in the no-display mode, to be larger than in the normal mode. At the intersection, the guide is sometimes difficult due to its shape and its environment. Even at the same intersection, the guide from one road to another is easy to understand, but the guide in the reverse direction is sometimes very difficult to understand. Therefore, the cost is increased at the intersection generally recognized difficult to guide. Additionally, when it is not clear how to travel only from a certain road to another certain road, only the turn cost from a link Nx to a link Ny is increased. Thereby, traveling in the unclear direction can be considerably avoided in the no-display mode. By searching, the point difficult to guide is determined in advance.

[Seventh Method]

A seventh method is to store a history of the number of moving (the number of traveling) for each road (i.e., for each link) at the time of the normal travel. The cost of the road which the user has passed in equal to or larger than the predetermined number is decreased, in the no-display mode, to be smaller than in the normal mode. Usually, it is easier for the user to travel on the road which he or she has passed a few or several times than the road which he or she has never passed, and only the sound guide generally enables the user to travel on the road without trouble. Based on the history of the number of moving, the cost is decreased so that the road which the user has passed is more frequently chosen.

[Route Guide Process]

Figure 6:
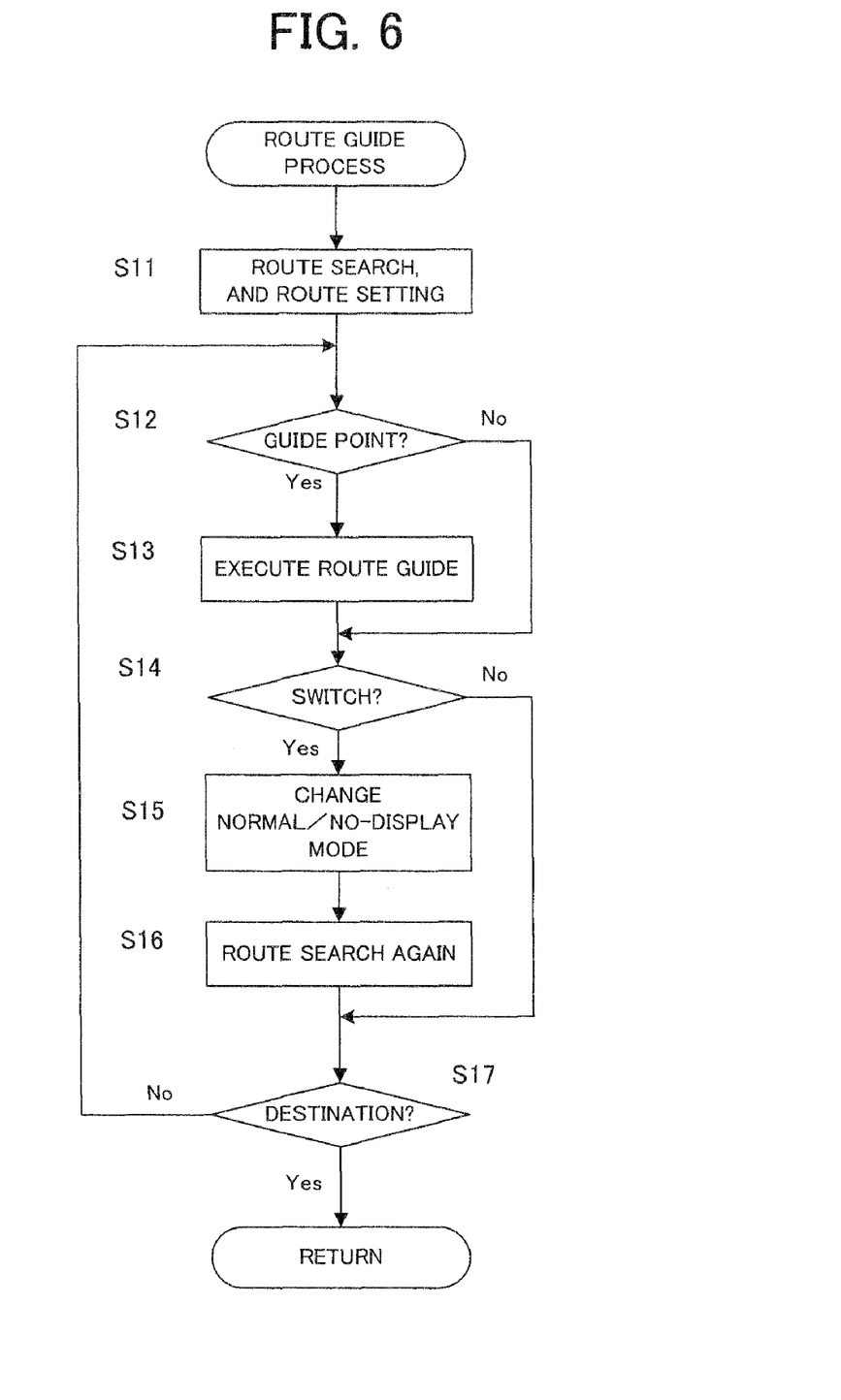
FIG. 6 is a flow chart of a route guide process.

Next, a description will be given of the route guide process according to an embodiment. FIG. 6 shows a flow chart of the route guide process. The CPU 22 in the system controller 20 executes a prepared program, and functions as the current position obtaining unit 101, the screen state detecting unit 102, the route searching unit 104 and the control unit 105, which are shown in FIG. 2. Thereby, the process is executed.

At the time of starting this process, the navigation screen is displayed on the display device, i.e., the screen state detecting unit 102 detects the display state. First, based on the destination designated by the user via the input device 60 and the current position of the vehicle obtained by the current position obtaining unit 101, the route searching unit 104 executes the route search, and sets the guide route (step S11). As described above, since the navigation screen is displayed at this point, the route search by the route searching unit 104 is executed in the normal mode.

When the guide route is set, it is determined whether or not the vehicle approaches the guide point (step S12) . Concretely, it is determined whether or not the current position of the vehicle reaches the point within the predetermined distance from the guide point on the guide route. When the vehicle approaches the guide point (step S12;Yes) the control unit 105 executes the route guide (step S13). In this case, the route guide is executed by both the display screen and the sound.

Next, the control unit 105 determines whether or not the screen state is switched based on the output of the screen state detecting unit 102 (step S13). Namely, by detecting whether or not the display screen of the display 44 is switched to the screen other than the navigation screen and whether or not the monitor of the navigation apparatus in the in-dash type is stored, it is determined whether or not the navigation screen is in the no-display state. When the screen state is switched, the control unit 105 changes the mode of the route guide from the normal mode to the no-display mode (step S15), and the route searching unit 104 executes the route search again in the changed mode (the no-display mode in this case) (step S16). Thereby, after the navigation screen becomes the no-display state, the route easy to guide only with the sound guide is calculated and set again according to the above first to seventh methods. Afterwards, the control unit 105 determines whether or not the vehicle arrives at the destination (step S17). When the vehicle arrives at the destination, the process ends. Meanwhile, when the vehicle does not arrive at the destination, the process returns to step S12, and the process from step S12 to step S16 is executed.

In this manner, until the vehicle arrives at the destination, the route guide is continued. Also, during the route guide, it is constantly determined whether or not the navigation screen is switched between the display state and the no-display state. When the navigation screen is switched, the mode of the route guide is also changed. Therefore, when the navigation screen is switched from the display state to the no-display state, the route search is executed again in the no-display mode, and the route guide is continued in the guide route easy to guide only with the sound. Meanwhile, when the navigation apparatus is switched from the no-display state to the display state, the route search is executed again in the normal mode, and the route guide is continued in the guide route suitable for the guide by both of the display screen and the sound.

[Modification]

In the above embodiment, by the first to seventh methods, the cost is changed in the route search in the no-display mode. However, it does not always mean that all of the first to seventh methods have to be employed. Namely, only the necessary methods of the first to seventh methods may be chosen to be applied to the navigation apparatus.

In the above embodiment, the navigation apparatus automatically executes the change between the normal mode and the no-display mode of the route guide by detecting the change between the display state and the no-display state of the navigation screen, i.e., displaying the screen other than the navigation screen, storing the monitor or removing the attachable/detachable monitor. Instead, by operating a remote controller and a button (not shown) on a display screen, the user may switch the normal mode and the no-display mode at will.

Industrial Applicability

This invention is applicable to the navigation apparatus of a movable body such as a vehicle.

The invention claimed is:

1. A navigation apparatus comprising:
   a display control unit which displays a navigation screen on a display device;
   a display state determining unit which determines whether a state is a display state in which the navigation screen is displayed or a no-display state in which the navigation screen is not displayed; and
   a route guide unit which searches a route to a destination and executes a route guide in accordance with a guide route obtained by searching,
   wherein, in the display state, the route guide unit determines the guide route and executes the route guide with a guide sound and a guide display on a display screen according to a normal mode, and
   wherein, in the no-display state, the route guide unit determines the guide route so that the determined route includes fewer right and left turns than in the normal mode and executes the route guide only with the guide sound according to a no-display mode.

2. The navigation apparatus according to claim 1, wherein the route guide unit determines the guide route, in the no-display mode, so that the determined route includes more straight forward advance at an intersection than in the normal mode.

3. The navigation apparatus according to claim 1, wherein the route guide unit includes a route searching unit which calculates totals of link costs assigned to roads forming each route and turn costs assigned to intersections for plural routes to the destination and which determines the route having a minimum total as the guide route.

4. The navigation apparatus according to claim 3, wherein the route searching unit increases, in the no-display mode, the turn cost of one of a right and a left turn at each intersection to be larger than in the normal mode.

5. The navigation apparatus according to claim 3, wherein, in the no-display mode, the route searching unit decreases the link cost corresponding to a wide road to be smaller than in the normal mode and increases the link cost corresponding to a narrow road to be larger than in the normal mode.

6. The navigation apparatus according to claim 3, further comprising a history storage unit which stores a number of past traveling in each road, wherein the route searching unit decreases, in the no-display mode, the link cost of a road having the number of past traveling, equal to or larger than a predetermined number, to be smaller than in the normal mode.

7. The navigation apparatus according to claim 1, wherein, when the display state determining unit detects a change of a display state, the route guide unit changes the mode between the normal mode and the no-display mode and executes the route search again in the changed mode.

8. A route guide method comprising:
   displaying a navigation screen on a display device;
   determining whether a state is a display state in which the navigation screen is displayed or a no-display state in which the navigation screen is not displayed; and
   searching a route to a destination and executes a route guide in accordance with a guide route obtained by searching,
   wherein, in the display state, the searching step executes route search and executes the route guide with a display screen and a guide sound in accordance with an obtained guide route according to a normal mode, and
   wherein, in the no-display state, the searching step executes the route search so that the searched route includes fewer right and left turns than in the normal mode and executes the route guide only with the guide sound in accordance with the obtained guide route according to a no-display mode.

9. A computer program product in a non-transitory computer-readable medium upon execution in a navigation apparatus performs the steps of:
   displaying navigation screen on a display device;
   determining whether a state is a display state in which the navigation screen is displayed or a no-display state in which the navigation screen is not displayed; and
   searching a route to a destination and executes a route guide in accordance with the guide route obtained by searching,
   wherein, in the display state, the searching step executes route search and executes the route guide with a display screen and a guide sound in accordance with an obtained guide route according to a normal mode, and wherein, in the no-display state, the searching step executes the route search so that the searched route includes fewer right and left turns than in the normal mode and executes the route guide only with the guide sound in accordance with the obtained guide route according to a no-display mode.

10. A non-transitory computer-readable medium which records a computer program upon execution in a navigation apparatus performs the steps of:

displaying a navigation screen on a display device;

determining whether a state is a display state in which the navigation screen is displayed or a no-display state in which the navigation screen is not displayed; and searching a route to a destination and executing a route guide in accordance with the guide route obtained by searching, wherein, in the display state, the searching step executes route search and executes the route guide with a display screen and a guide sound in accordance with an obtained guide route according to a normal mode, and wherein, in the no-display state, the searching step executes the route search so that the searched route includes fewer right and left turns than in the normal mode and executes the route guide only with the guide sound in accordance with the obtained guide route according to a no-display mode.

* * * * *